March 16, 1971  J. F. BRIGGS  3,570,246
HYDRAULIC TORQUE CONVERTER
Filed March 11, 1969  2 Sheets-Sheet 1
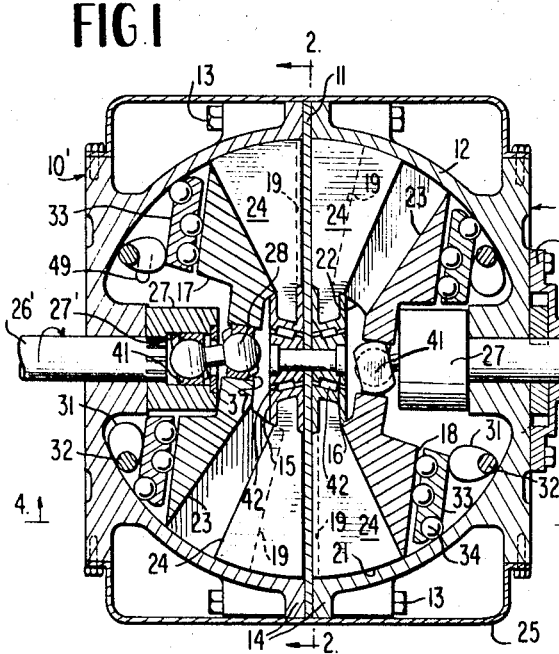
INVENTOR
J. FLOYD BRIGGS
BY Watson, Cole, Grindle & Watson
ATTORNEYS March 16, 1971  J. F. BRIGGS  3,570,246

HYDRAULIC TORQUE CONVERTER

Filed March 11, 1969  2 Sheets-Sheet 2

INVENTOR
J. FLOYD BRIGGS

BY
Watson, Cole, Grindle & Watson
ATTORNEYS

United States Patent Office 3,570,246
Patented Mar. 16, 1971

3,570,246
HYDRAULIC TORQUE CONVERTER
Joe Floyd Briggs, 2801 Quebec St. NW., Apt. 445,
Washington, D.C. 20008
Filed Mar. 11, 1969, Ser. No. 806,055
Int. Cl. F16d *31/06*
U.S. Cl. 60—53
13 Claims

ABSTRACT OF THE DISCLOSURE

A torque converter comprising a pair of identical hydraulic pumps rotatable about a common axis and operatively opposed to one another so that one pump drives the other. Each pump is so designed that the output of either may be varied independently of its speed making possible variable speed ratios as power is transmitted through the converter.

---

This invention relates generally to a torque converter or hydraulic transmission device and more particularly to a positive displacement hydraulic device with speed ratios capable of being infinitely varied within the designed limits, the changes in ratio being made possible without clutches or gears and without interruption of the flow of power through the converter.

Known positive displacement hydraulic transmission devices are generally so constructed that the working fluid is forced through constricted openings and passages with consequent large power losses from friction and turbulence. Turbine-type transmissions avoid this but are subject to slippage under load.

With the above considerations in mind, it is an object of the present invention to provide a hydraulic torque converter or transmission device with openings sufficiently large whereby the passage of fluid may be so direct that friction and turbulence are kept to a minimum, the fluid passing from the driving pump to the driven pump and returning in a continuous flow thereby providing the smooth operation and greater efficiency as in a turbine while retaining the positive drive characteristic of a pump.

Another object of this invention is to provide a torque converter consisting of two positive displacement hydraulic pumps rotating about the same axis and opposed to one another so that one drives the other, that is, when one is turned by a prime mover it acts as a pump and the other as a motor.

A further object of this design is to provide a torque converter of the type described wherein the pumps operate on the sliding vane principle.

A still further object of the invention is to provide a torque converter as characterized wherein both hydraulic pumps are so designed that the output of either can be varied independently of its speed, thereby making possible variable ratios of multiplication or reduction of torque and speed when power is transmitted through the converter.

A still further object of the invention is to provide a torque converter of the character described wherein a fixed perforated plate means is provided for dividing a spherical casing into two semi-spherical chambers, each pump being located in a respective chamber and each being rotatable about a common axis perpendicular to the plate means, and means within the casing for independently changing the axis of rotation of each pump with respect to the common axis thereby varying the output of each pump so as to make possible variable speed ratios when power is transmitted through the converter.

A still further object of the invention is to provide a hydraulic transmission device as described wherein each pump comprises a rotor having a spherical surface forming a seal with the surface of the chamber and also having a conical end, each rotor being respectively connected to a shaft whereby one of the rotors acts as a pump and the other of the rotors acts as a motor for transmitting the power from a prime mover through the converter.

A still further object of the invention is to provide a torque converter of the type described wherein each rotor is connected to its respective shaft by means of a double universal joint so that the axis of rotation of each rotor may be varied in relation to its respective shaft.

A still further object of the present invention is to provide a double universal joint for permitting the axis of rotation of one member to be varied with respect to the longitudinal axis of another member about which the first member rotates.

A still further object of the present invention is to provide a double universal joint of the character described having a bearing means located in each of the members and interconnected by means of a shank portion, each bearing being shaped in the form of a least one pair of opposite convex faces and having bushings slidable on each face for permitting the rotatable member to be variably inclined while it is rotating.

Other objects, advantages and novel features of the invention will become apparent from the following detailed description of the invention when considered in conjunction with the accompanying drawings wherein:

FIG. 1 is a vertical sectional view of the torque converter according to the invention showing the parts in elevation;

FIG. 2 is a view taken substantially along the line 2—2 of FIG. 1 showing the vanes on one of the rotors in their relation to a center plate which divides the converter into a pair of hemispheres;

FIG. 3 is a plan view showing the details of the center plate;

FIG. 4 is a partial sectional view taken along the line 4—4 of FIG. 1, rotated counter-clockwise 90°, showing the rotors and their inserted vanes as a perspective view in the interest of clarity;

FIG. 5 is an exploded perspective view showing a portion of the double universal joint slightly enlarged;

Figure 9:
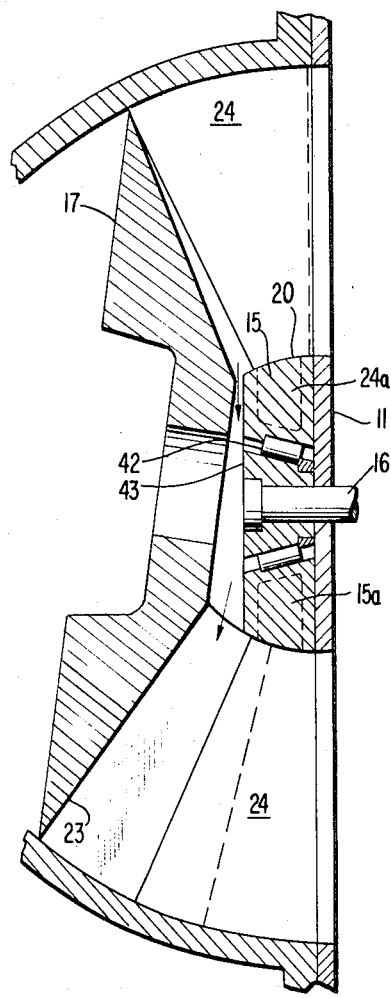
Figure 10:
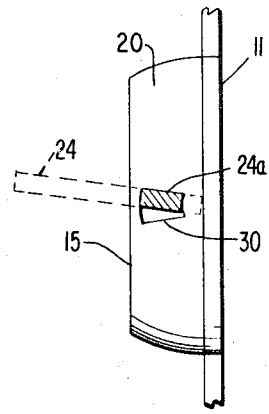

FIGS. 6 and 7 are cross-sectional views taken along the lines 6—6 and 7—7, respectively, of FIG. 5;

FIGS. 8a through 8e are schematic views showing alternative positions of the rotors for various typical speed ratios;

FIG. 9 is a view similar to FIG. 1, slightly enlarged, showing one of the rotors and its sliding venes in relation to the converter casing and the boss assembly; and FIG. 10 is a view showing a manner of connecting the rotor vanes to the boss assembly.

Turning now to the drawings wherein like reference characters refer to like and corresponding parts throughout the several views, there is shown in FIG. 1 a vertical section through the torque converter according to the present invention which comprises two positive displacement hydraulic pump assemblies 10, 10', substantially identical in their construction on both sides of a center plate 11. Accordingly, only one of these pumps will be described in detail, it being understood that the description of each element for pump assembly 10 will not be specifically repeated for pump assembly 10'. A housing or generally hemispherical casing 12 is assembled onto both sides of the plate 11 by means of a series of bolts 13 extending through axially aligned apertures in the plate and adjoining flanges extending outwardly along the periphery of each casing 12. The center of curvature of each casing is located at the center point of the near face of center plate 11. A boss assembly 15 is also attached to both sides of the plate 11 by means of a bolt 16, in the usual manner. Each assembly 15 (see FIG. 9) comprises a ring 20, inner hub 43 and roller bearings 42, the ring 20 thereby being rotatable about the inner hub 43 fixed to plate 11. Each ring 20 is in the form of a truncated half-sphere having a center of curvature which is the same as noted for each of the casings 12. Within each of the hemispherical chambers defined by casing 12 and center plate 11, a rotor 17 is provided in the form of a truncated cone having a base 18, a conical face 19 and a spherical outer surface 21 conforming to the radius of curvature of casing 12. The conical face 19 is relieved as at 22 so that the rotor 17 may be snugly fitted over the boss 15 as shown in FIG. 1. Each of the rotors 17 is slotted as at 23 (see FIG. 4 for a clearer showing) radially about the conical face 19 toward the base 18 substantially as shown in FIG. 1. With reference to FIG. 9, a vane 24 is shown provided within each slot 23 with the outer and inner edges of each vane conforming precisely to the curvature of the casing 12 and the inner hub 43 respectively. The slots 23 are made deep enough to permit easy flow of fluid between slots (shown by the arrows in FIG. 9) as the space of the slot behind each vane diminishes and enlarges with rotation of rotors 17. The assembled housings 12 are completely enclosed in a hydraulic fluid reservoir 25.

The rotor 17 within pump assembly 10 is connected to an input shaft 26 through a hub member 27 fitted around one end of the shaft. The rotor 17 within housing 10' is similarly connected to an output shaft 26'. The means for connecting the rotors 17 to their respective shafts comprises a double universal joint assembly 28 to be hereinafter more fully described.

Hydraulic fluid occupies each of the hemispherical chambers within the spaces to both sides of the rotors 17. Also, the center plate 11 is provided with cutout portions 29 so that the fluid between the plate 11 and rotors 17 within each chamber may readily flow between one pump assembly 10 to the other assembly 10'. Therefore, as the input shaft 26 rotates (from a prime mover or power source not shown), the rotor 17 acts as a pump since it passes fluid from the chamber in assembly 10 through the centerplate 11 and into the chamber of assembly 10' whereby the rotor 17 of that chamber is thereby driven for transmitting power through the converter from the output shaft 26.

As each of the rotors 17 turns, its angle of inclination with respect to center plate 11 is maintained by means of cams 31 rotatable about their respective shafts 32 which are located between the insidewall of casing 12 and a bearing plate 33 provided with a suitable number of ball bearings 34. As can be seen in FIG. 1, the ball bearings 34 and bearing plate 33 transmit the reaction of the rotors 17 through cams 31 to the casing 12, thereby preventing undue pressure of the spherical surfaces of the rotors 17 against casing 12. As the cam shafts 32 are rotated clockwise, by means of suitably provided levers, for example (not shown), the angle of inclination of each rotor 17 may be changed as bearing plate 33 is tilted by means of the rotating cams 31. In order to reduce friction between the bearing plate 33 and the inner wall of the casing 12, it can be seen that ball bearings 34 are also provided between these two surfaces. The plane containing the rotational axis of each rotor 17 is parallel to the centerline, as shown in FIG. 2 of the drawings, so that the point of nearest approach of each rotor to the center plate 11 will occur along the centerline. This can be seen by making reference to either FIG. 1 or FIG. 4 which show rotors 17 fully tilted toward center plate 11 so that a portion of each face 19 is adjacent center plate 11 in the lower right and upper left quadrants of the converter.

As pointed out in the description earlier, each of the rotors 17 are connected to their respective shafts 26, 26' by means of a double universal joint 28. Reference is made to FIGS. 5, 6, and 7 of the drawings wherein it can be seen that a shank portion 35 is shown having a bearing 36 secured to each end thereof (only one such bearing being shown). As can be seen in FIG. 1, one of such bearings 36 is inserted within a square-shaped aperture 27' of the hub 27 of each shaft 26, 26', and the other of such bearings is inserted within a square-shaped aperture 37 provided within each of the rotors 17. Each of the bearings 36 is shaped in the form of two pairs of opposite convex, semi-circular faces 38 meeting at a pair of points 39 (see FIG. 7) along the longitudinal axis of the shank 35. A bushing 41 is seated against each of the convex surfaces 38. The inner surface of each bushing is concavely shaped to conform to the convex shape of its adjacent convex surface 36, and is flat at its outer surface so that, when assembled about the bearing 36, as shown in FIG. 6, the double universal joint assembly 28 may be snugly fitted within the apertures 27', 37 respectively, as shown in FIG. 1. Accordingly, rotary motion is transmitted from the shafts 26, 26' to their respective rotors 17 without slippage because, as can be seen clearly in FIG. 6, the vertical cross-section of each bearing 36 is square-shaped. During such rotation, however, each rotor 17 may be variably inclined so that its axis of rotation is changed with respect to the axis of their respective shafts 26, 26'. During the course of changing the inclination of rotors 17, the bearing surfaces 38 on each bearing 36 will slide within the bushings 41 located within their respective apertures 27', 37. Accordingly, the slope of shank portion 35 will change somewhat (as shown in FIG. 1) in order to accommodate such variable inclination. In FIG. 5, FIG. 6 and FIG. 1 it can be seen that the bushings 41 have their ends rounded and beveled so that they can move angularly with respect to each other during rotation. Accordingly, the bearings 36, with their adjoining bushings 41, will fit snugly within the apertures 27', 37, respectively, since each of the apertures 27', 37 is dimensioned to a close tolerance with respect to the assembled bearings and bushings as shown in FIG. 6.

The edges of the sliding vanes 24 are held constantly against both sides of the center plate by means of extensions 24a provided on their inner end which engage with slots 30 in ring 20. The side-to-side fit of the slots 30 is sufficiently loose, as shown in FIG. 10, to allow the vanes to tilt slightly in accordance with the inclination of rotors 17. When the inclined position of each rotor 17 is varied, the rotors slide with respect to the vanes in the slots 23 so that the volume contained between a pair of vanes 24, rotor 17, and center plate 11 varies according to the distance of that part of the rotor from the center plate.

Referring to FIGS. 2, 3, and 4, it can be seen that two pairs of elongated, radial slots 44 are provided in the center plate 11. Since the angular distance between each pair of slots 44 is equal to the angular distance between two of the sliding vanes 24, at least one sliding vane from each rotor 17 will always contact the center plate 11 in the area between cutout portions 29, 29a in the vicinity of the centerline as shown in FIG. 2. Accordingly, fluid cannot flow reversely through the cutouts 29, 29a of the center plate during rotation of the rotors 17. This cutout arrangement of the center plate permits a continuous separation of the high-pressure side of the pump assemblies 10, 10' from the low-pressure side. While the pump rotor 17 (the rotor shown lying above the center plate 11 in FIG. 4) is in the position as shown, less fluid will be contained between a pair of vanes, the conical face 19, and the center plate 11, than will be contained within a similar volume at its diametrically opposite side. Accordingly, with the rotor 17 shown closest to the center plate 11 as in the lower right quadrant of FIG. 1, the volume of fluid that can pass at this position between the rotor and the center plate will be less than the volume of fluid contained between the rotor, vanes, and center plate as shown in the upper right quadrant of FIG. 1. The difference will be forced to pass through cutout opening 29a to the driven pump motor within the pump assembly 10' where the sequence of movements is the reverse. From the assembly 10', the fluid will return through the center plate 11 by means of the cutout opening 29, as shown by the arrows in FIG. 4 of the drawings.

The cams 31 are sized and positioned so that the rotors 17 cannot approach the center plate 11 closer than the clearance 45, as shown in FIG. 4. Accordingly, the fluid being moved by vane 24 at position 46 (see FIG. 4) and contained by the vane, center plate, and the conical face 19 of the rotor, will pass between the rotor and the center plate with an increase in velocity and will not be trapped in the triangular space behind the center line of the rotor as would happen if the rotor touched the center plate.

The portions 47 of the center plate 11 between cutouts 29, 29a and slots 44, respectively, are tapered upwardly to smooth the flow of fluid along the arrows as shown in FIG. 4. Likewise, portions 48 of the center plate 11, as shown in FIG. 3, are tapered downwardly to direct the fluid flow near that side of the plate 11.

When vane 24, from its position shown as at 46 in FIG. 4, passes the leading edge of the portion 47 adjacent thereto, it will be pushing more fluid than can be contained between such a vane and its forwardly adjacent vane when centered between both leading edges of the portions 47 because the inclination of the rotor causes the volume of the chambers between vanes to decrease toward the low point of the rotor. Therefore, slots 44, which act as pressure relief slots in the center plate, act to provide escape of excess fluid. The angular distance between slots 44 in each pair is equal to the angular distance between adjacent sliding vanes 24 plus the thickness of these two vanes, so that when two vanes on the side of the rotor 17 inclined nearest the center plate are centered between the leading edges of portion 47, the fluid contained between them is the minimum for that rotor angle, and can pass as stated above, without compression. In like manner, when a pair of vanes passes slots 44, but before the leading vane moves off the center plate, the slight increase in volume behind the leading vane will fill with fluid through one of slots 44 and formation of a vacuum will be accordingly prevented.

Turning now to FIGS. 8a through 8e, it is to be noted that the driving pump is referred to as pump assembly 10 and the driven pump is referred to as pump assembly 10'. Also, the shafts 26, 26' are considered to be rotating in a clockwise direction as shown by the arrows in FIG. 1. Further, it should be understood that FIG. 8a is a schematic showing the pumps in the same position as shown in FIGS. 1 and 4, that is, a one-to-one ratio because each pump is inclined to its maximum opposite position. Changes in such a one-to-one ratio may be made by varying the angle of inclination of the rotors 17 with respect to the center plate 11, either separately or simultaneously. As indicated earlier, such an inclination is brought about by movement of the cams 31, together, located within the pump assembly 10 so as to tilt the bearing plate 33 to a desired position. Lever means, not disclosed, may be used to move the cams by rotation of their cam shafts 32. Of course, such a lever arrangement will rotate the cam shafts 32 located within the pump assembly 10' in a similar manner, either separately or simultaneously, so that the bearing plate 33 within assembly 10' may also be inclined as desired.

When the angle of the driving rotor is less than that of the driven rotor (see FIG. 8b), it will pass less fluid per revolution than the driven rotor and, consequently, will have a mechanical advantage, giving a multiplication of torque and a reduction of speed through the converter. Accordingly, the transmission device, with its rotors shown inclined as in FIG. 8b, will operate on a one-to-two ratio approximately between the output shaft 26' and the input shaft 26.

When the angle of the driving rotor is made greater than that of the driven rotor, as in FIG. 8c, a reverse condition as compared to that shown in FIG. 8b will be brought about, thereby resulting in an overdrive. Accordingly, FIG. 8c shows the relative positions of the rotors when the torque converter is driving in a two-to-one ratio approximately of speed.

When the driving motor in assembly 10 is parallel to the center plate as shown in FIG. 8d, no fluid will be forced from the driving pump assembly 10, and the driven pump assembly 10' will not be turned. Therefore, FIG. 8d displays a neutral position for the torque converter.

If the driving rotor is tilted beyond its neutral position, as shown in FIG. 8e, the driven rotor will be rotated in reverse, although with reduced efficiency, since the direction of fluid flow will reverse twice in each cycle from the driving pump to the driven pump and return.

A cam stop 49, see FIG. 1, is provided on one of cams 31 so that the driven rotor will always have at least a minimum inclination with respect to the center plate 11. Therefore, the driven rotor cannot be moved to a parallel position which would close the outlet from the driving pump and possibly cause an excessive build-up of pressure.

The central chamber between the two rotors, as explained earlier, is filled with fluid including the spaces contained between sliding vanes 24, rotors 17 and the center plate 11. That portion of the chamber within pump assembly 10 may be looked upon as a fluid containing pump work chamber, while the corresponding portion of the chamber contained within the assembly 10' may be called a fluid containing motor work chamber because of the respective roles taken by each of the rotors 17. The chambers containing bearing plates 33 and universal joints 28 are also filled with fluid for lubrication and to resist the pressure of any leakage from the central chamber. As each rotor 17, housing 12, and ring 20 are all curved about the same center point, fluid in the central chamber is sealed off from the other chambers by the rotors 17. Also, the snug fit of the sliding vanes within the slots in the rotors maintains separation of the fluid within the central chamber from the remaining fluid within each pump assembly. Regardless of their inclination, each rotor will always fit snugly against the bosses and the insides of the casings because of the common point of curvature of these members.

It should be noted that bearings and fluid seals for each of these shafts 26, 26' are not shown. Also, a make-up pump 51, which is a relatively small positive displacement pump, is keyed to the driving shaft 26 and is provided with the necessary piping and valves (not shown) to keep the chambers in each pump assembly 10, 10' filled from the fluid reservoir 25 which surrounds the pump assembly. A suitable piping and valve arrangement may be provided, in the customary manner, wherein a pressure drop below normal in the torque converter opens and closes check valves and by-pass valves, respectively, so that fluid may be forced into the converter by the make-up pump 51. When the converter is filled, such a check valve will be closed and the by-pass valve open so that fluid may be by-passed back to the reservoir 25. In case of excess pressure from the make-up pump 51 or in the converter itself, a pressure relief valve may be provided which open for permitting fluid to escape to the reservoir.

As an alternative to the use of extensions 24a interlocked in slots 30 in ring 20 for maintaining the vanes in sliding engagement with the the plate, an inner casing within each chamber could be provided for rotation with the vanes and rotor in each chamber, the opposite ends of each vane being engaged with the inner casing and the boss assembly, respectively, so as to rotate as a unit.

It should be noted that the cross-section of each bearing 36 may be rectangular. In addition, the bearing 36, shaped by four intersecting concave surfaces as disclosed, permits an inclination in a plane perpendicular to that shown with reference to FIG. 1. Accordingly, the surfaces 38 in contact with bushings 41 will slide thereon when a rotatable member such as the rotor 17, is tilted for movement in a plane perpendicular to the plane of inclination as described in FIG. 1.

Without departing from the spirit of the invention, it should be further understood that the converter could be designed as a single pump assembly in its relation to the center plate 11 and having suitable suction and discharge piping. Accordingly, the assembly would be acting as a pump only, having the advantages of variable output in relation to speed and having reversibility of flow through the center plate.

Obviously many modifications and variations of the present invention are possible in the light of the above teachings. It is therefore to be understood that within the scope of the appended claims the invention may be practiced otherwise than as specifically described.

What is claimed is:

1. A variable torque converter comprising, in combination:
   a generally spherical casing;
   a fixed perforated plate dividing said casing into two hemispherical chambers;
   first and second positive displacement hydraulic pumps in said chambers, respectively, each rotatable about a common axis perpendicular to said plate;
   each of said first and second pumps comprising a rotor having a spherical surface forming a seal with each of the inner surfaces of said respective chambers, each said rotor also having a conical end;
   said casing having a fluid containing pump work chamber located between said plate and said first pump, and a fluid containing motor work chamber located between said plate and said second pump, said motor work chamber communicating with said pump work chamber;
   means on said first and second pumps in sliding engagement with said perforated plate for passing fluid and driving said second pump from said first pump;
   said first pump being driven by a first shaft connected thereto;
   said second pump connected to a second shaft for transmitting power therefrom through the converter, said shafts providing said common axis; and
   means within said casing for independently changing the axis of rotation of each said first and second pumps with respect to said common axis thereby varying the output of each said pump, whereby variable ratios of multiplication or reduction of torque and speed are made possible when power is transmitted through the converter.

2. The variable torque converter according to claim 1 wherein said perforated means in sliding engagement with said plate comprises a plurality of vanes radially disposed on said conical ends of each said rotor.

3. The variable torque converter according to claim 2 further including means within each of said chambers for maintaining said vanes in sliding engagement with said perforated plate.

4. The variable torque converter according to claim 3 wherein said means for maintaining said vanes in sliding engagement with said perforated plate comprises a boss assembly mounted on each side of said perforated plate, each of said vanes having an extension provided on their inner end, and said boss assembly being provided with slots along its outer surface for the reception of each said extension.

5. The variable torque converter according to claim 4 wherein each said boss assembly comprises a ring member, an inner hub member and bearing means between said ring and said hub members, each said inner hub member being rigidly mounted to said plate means and said slots being located on each said ring member whereby each of said vanes within each said chamber may rotate about each said inner hub member during rotation of said first and said second pump.

6. The variable torque converter according to claim 5 wherein each of said slots on each said ring member is of a wider dimension as compared to the thickness of each said vane extension thereby allowing each of said vanes to tilt slightly in accordance with the change of rotational axis of each of said pumps with respect to said common axis.

7. The variable torque converter according to claim 6 wherein said means for independently changing the axis of rotation comprises a bearing plate located at the base of each said rotor, and cam means for tilting each said bearing plate and said adjoining rotors.

8. The variable torque converter according to claim 7 wherein said first and second pumps are connected to said first and second shafts, respectively, by means of a double universal joint so as to enable the axis of rotation of each to be varied with respect to said common axis.

9. A double universal joint for permitting the axis of rotation of one member to be varied with respect to the longitudinal axis of another member about which said one member rotates, comprising:
   a shank portion having a bearing at each end thereof, each said bearing being rectangular in vertical cross-section perpendicular to the longitudinal axis of said shank and being shaped into at least one pair of opposite convex faces meeting at a pair of points along said shank axis; and
   a bushing in contact with each said face, the inner surface of each said bushing being concavely shaped to conform to each of said convex faces and the outer surface of each said bushing being flat for enabling each said bearing to be snugly fitted within a rectangular aperture provided in said one member and said another member, respectively, whereby each of said bushings slide on each said convex face as the axis of rotation of said one member is varied in one direction with respect to the longitudinal axis of said another member.

10. The universal joint according to claim 9 wherein each said bearing is shaped into two pairs of opposite convex faces meeting at a pair of points along said shank axis whereby each of said bushings may slide relative to said convex faces as the axis of rotation of said one member is varied in two directions with respect to the longitudinal axis of said another member.

11. The double universal joint according to claim 10 wherein said bushings have their ends rounded and beveled to permit them to move angularly in relation to each other within said apertures according to the angle of inclination of said bearings with respect to the axis of rotation of said members containing said apertures.

12. The variable torque converter according to claim 2 wherein said perforated plate is provided with pressure relief slots for permitting escape of any excess fluid during the passing of fluid by said vanes when driving said second pump from said first pump.

13. The variable torque converter according to claim 7 wherein each of said cam means includes a rotatable cam, one of said cams for said second pump rotor being provided with a cam stop whereby said second pump rotor will always have at least a minimum inclination with respect to said fixed perforated plate.

References Cited
UNITED STATES PATENTS

| | | | |
|---|---|---|---|
| 2,401,376 | 6/1946 | Sherman | 60—53D |
| 2,962,864 | 12/1960 | Van Cleve | 60—53D |

EDGAR W. GEOGHEGAN, Primary Examiner

U.S. Cl. X.R.

418—29, 53